(12) United States Patent
Bessette et al.

(10) Patent No.: US 11,958,534 B2
(45) Date of Patent: Apr. 16, 2024

(54) UNDERFRAME STRUCTURE FOR A MOTOR VEHICLE COMPRISING A LATERAL REINFORCEMENT PART

(71) Applicant: PSA AUTOMOBILES SA, Poissy (FR)

(72) Inventors: Damien Bessette, Ecot (FR); Raymond Ma, Velizy Villacoublay (FR)

(73) Assignee: STELLANTIS AUTO SAS, Poissy (FR)

( * ) Notice: Subject to any disclaimer, the term of this patent is extended or adjusted under 35 U.S.C. 154(b) by 0 days.

(21) Appl. No.: 18/264,014

(22) PCT Filed: Jan. 18, 2022

(86) PCT No.: PCT/FR2022/050100
§ 371 (c)(1),
(2) Date: Aug. 2, 2023

(87) PCT Pub. No.: WO2022/175611
PCT Pub. Date: Aug. 25, 2022

(65) Prior Publication Data
US 2024/0043066 A1    Feb. 8, 2024

(30) Foreign Application Priority Data

Feb. 22, 2021 (FR) ..................................... 2101699

(51) Int. Cl.
*B60K 1/04* (2019.01)
*B62D 21/15* (2006.01)
(Continued)

(52) U.S. Cl.
CPC .............. *B62D 21/157* (2013.01); *B60K 1/04* (2013.01); *B62D 25/2027* (2013.01);
(Continued)

(58) Field of Classification Search
CPC ...... B62D 25/087; B62D 25/08; B62D 25/20; B62D 25/02; B62D 25/2027;
(Continued)

(56) References Cited

U.S. PATENT DOCUMENTS

| | | | |
|---|---|---|---|
| 6,039,386 A * | 3/2000 | Hasshi | B62D 25/2036 296/205 |
| 2016/0052467 A1* | 2/2016 | Dubois | B60K 13/06 296/193.07 |
| 2019/0232773 A1* | 8/2019 | Kasai | B62D 21/157 |

FOREIGN PATENT DOCUMENTS

| | | |
|---|---|---|
| CN | 208021558 U | 10/2018 |
| JP | H10129533 A | 5/1998 |

OTHER PUBLICATIONS

International Search Report to corresponding PCT/FR2022/050100 dated May 19, 2022.
(Continued)

*Primary Examiner* — Jason D Shanske
*Assistant Examiner* — James J Triggs
(74) *Attorney, Agent, or Firm* — Sandberg Phoenix & von Gontard P.C.

(57) ABSTRACT

An underframe structure for a motor vehicle, the underframe structure comprising a floor (12), and at least two longitudinal side members (14) respectively disposed on each side of the floor (12); the floor (12) is divided into at least one front unit (16) and one rear unit (18) fixed to a transverse heel board (24). The underframe structure also comprises a lateral reinforcement part (26) which comprises at least one elongate body extending from the heel board towards the closest side member, the lateral reinforcement part is fixed on one side to the heel board (24), and on the other side to the front unit (16) of the floor (12) or to a side member (14) in the region of the front unit (16) of the floor.

13 Claims, 2 Drawing Sheets

(51) Int. Cl.
*B62D 25/20* (2006.01)
*H01M 50/242* (2021.01)
*H01M 50/249* (2021.01)

(52) U.S. Cl.
CPC ....... *H01M 50/242* (2021.01); *H01M 50/249* (2021.01); *B60K 2001/0438* (2013.01); *H01M 2220/20* (2013.01)

(58) Field of Classification Search
CPC ..................... B62D 21/157; B60K 2001/0438; B60K 1/04; H01M 50/249
See application file for complete search history.

(56) References Cited

OTHER PUBLICATIONS

Written Opinion to corresponding PCT/FR2022/050100 dated May 19, 2022.

\* cited by examiner

[Fig. 1]
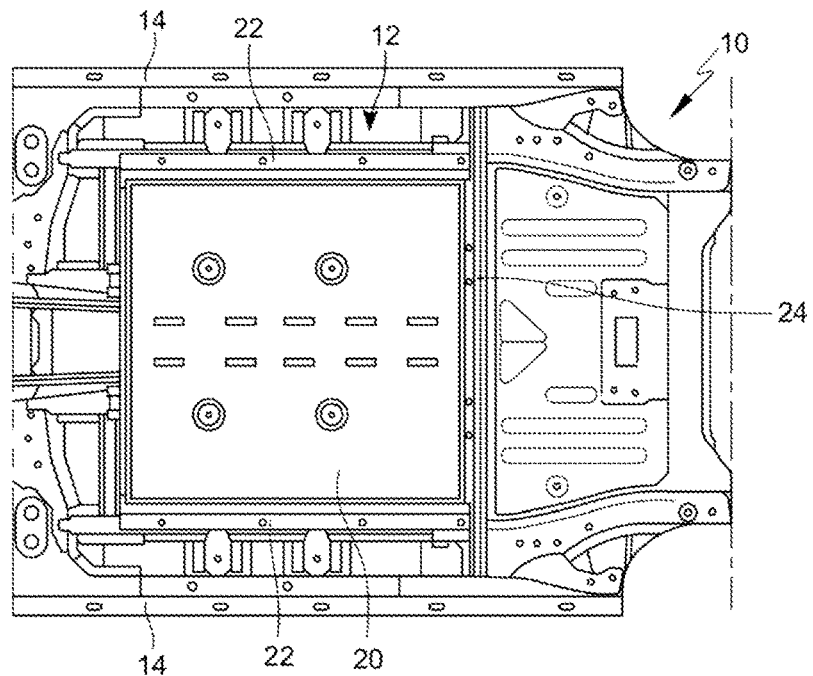
[Fig. 2]
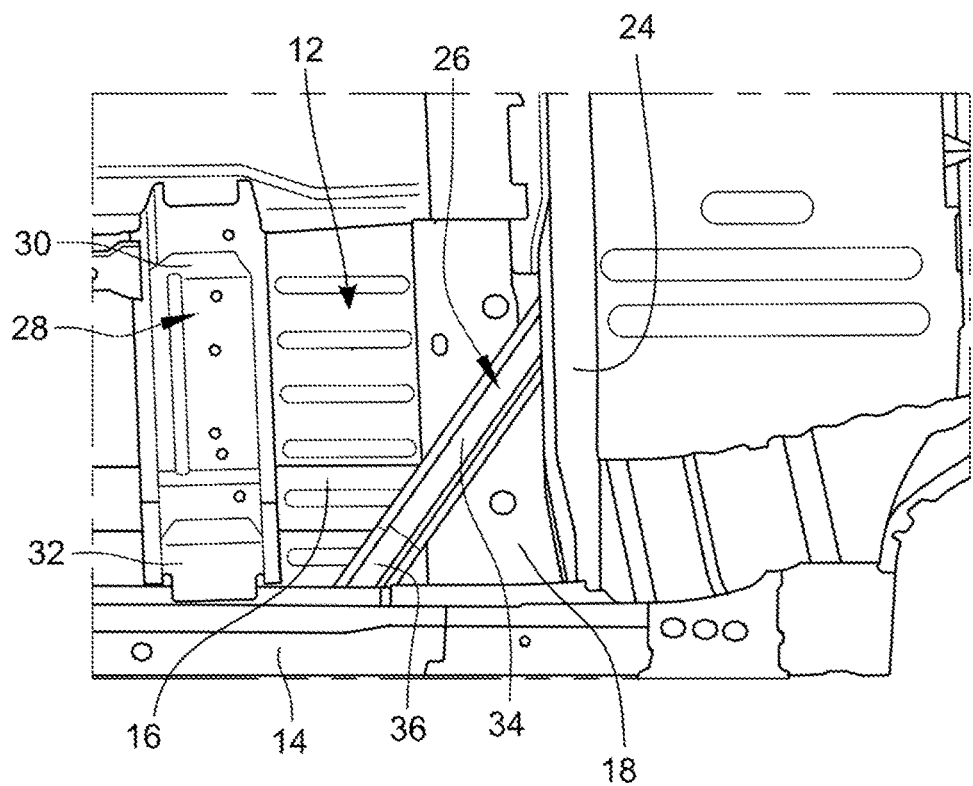

[Fig. 3]
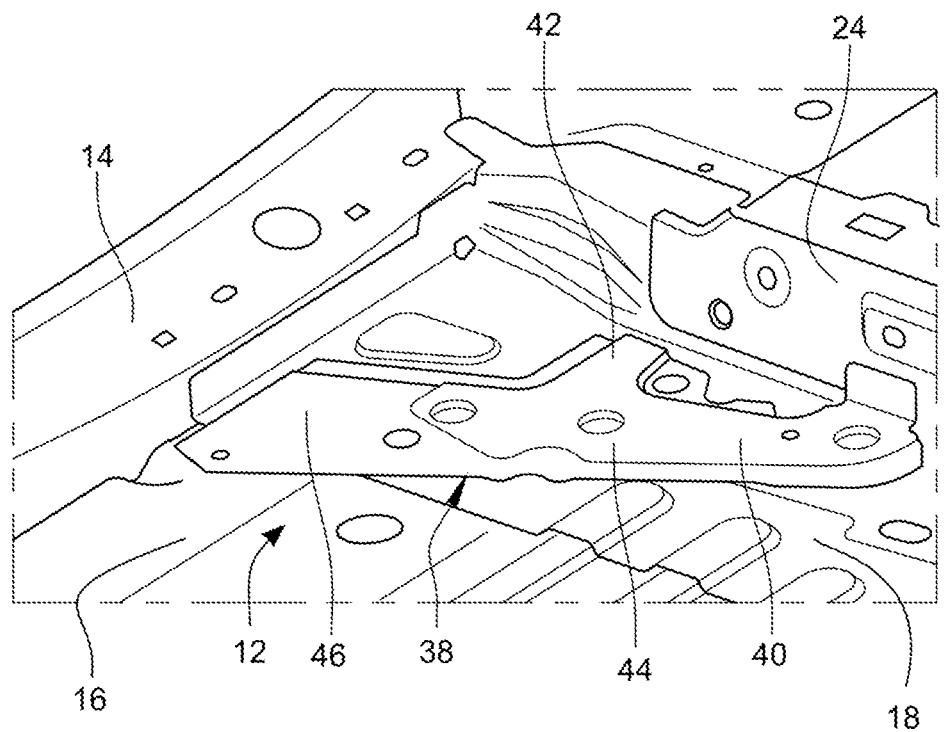

UNDERFRAME STRUCTURE FOR A MOTOR VEHICLE COMPRISING A LATERAL REINFORCEMENT PART

CROSS-REFERENCE TO RELATED APPLICATIONS

This application is the US National Stage under 35 USC § 371 of International Application No. PCT/FR2022/050100, filed Jan. 18, 2022, which claims the priority of French application 2101699 filed on Feb. 22, 2021, the content (text, drawings and claims) of both said applications incorporated by reference herein.

BACKGROUND

The devices described herein relate to the field of structures for a vehicle and especially for a motor vehicle. More particularly, an underframe structure for a motor vehicle is described.

The production of an underframe structure of a vehicle, and especially of a motor vehicle, must comply with several requirements, in particular with impact tests.

A test measures, for example, the resistance of a vehicle to a lateral impact of the "pole impact" type. In this test, a vehicle is mounted on a platform launched at 32 km/h with an impact angle of 75° with respect to the longitudinal direction of the vehicle. The vehicle is positioned so that it strikes a post at the front driver's seat. Since the deformation of the passenger compartment entails significant risks of injury, especially at the thorax or abdomen, the test aims particularly to evaluate the amplitude of this deformation.

In the event of a lateral impact of the "pole impact" type, a part of the forces resulting from the impact passes through the underframe structure. An underframe structure generally consists of a floor that extends between at least two longitudinal side members disposed on each side of the vehicle.

The underframe structure can be divided into a front unit and a rear unit which are assembled at the floor. Thus, the floor of the underframe structure can be divided into a front unit and a rear unit fixed to a transverse heel board. The front and rear units of the floor are two discrete pieces of sheet metal. The length of the front and/or rear units of the floor is predetermined based on the wheelbase of the vehicle. This length may be different depending on the various vehicle models.

In the context of an electric vehicle or a hybrid electric vehicle, the integration of the batteries and specific equipment entails an overload of approximately 400 kg with respect to an internal combustion vehicle.

The battery tray is generally mounted below the front unit of the floor, for example at seat crossmembers. This results in a much greater rigidity of the underframe structure at the front unit of the floor with respect to the rear unit.

This difference in rigidity between the front and rear units of the floor of the underframe structure causes significant shear stresses at the rear unit during an impact of the pole impact type, with a high risk of opening of the floor of the underframe structure.

Due to the diversity of wheelbases for a given vehicle model, it is not possible to fix the battery tray at the rear unit of the floor of the underframe structure.

There is therefore a need to improve the behavior of an underframe structure in the event of a pole impact.

SUMMARY

Solutions are known for increasing the rigidity of an underframe structure such as, for example, in document CN208021558U. The latter describes an underframe structure of a motor vehicle comprising two side members separated by a floor, and a crossmember connecting the two side members at the rear wheels of the vehicle. A reinforcement beam is fixed on one side to a side member and on the other side to the crossmember so as to improve the torsional rigidity of the underframe structure of the vehicle.

This solution is not suitable for absorbing pole-type impacts. In addition, this document does not take into account the issue of an underframe structure comprising a front unit and a rear unit having different rigidities.

The devices described herein aim to solve at least one of the problems and/or disadvantages mentioned hereinbefore. In particular, described herein is an underframe structure for a vehicle comprising a floor with a front unit and a rear unit, which limits the effects of the shear stresses due to the differences in rigidity between the front and rear units of the floor, in the context of a lateral impact. Preferably, the described devices comprise an underframe structure for a vehicle comprising a floor with a front unit and a rear unit, which limits the effects of the shear stresses due to the differences in rigidity between the front and rear units of the floor, in the context of a lateral impact, which is not very complex and which can be adapted to vehicles having different wheelbases.

To this end, and according to a first aspect, the described devices relate to an underframe structure for a motor vehicle, the underframe structure comprising, a floor, and at least two longitudinal side members respectively disposed at each longitudinal edge of the floor; the floor is divided into at least one front unit; and one rear unit fixed to a transverse heel board.

The underframe structure is characterized in that it further comprises at least one lateral reinforcement part which comprises at least one elongate body extending from the heel board towards the closest side member; the lateral reinforcement part is fixed on one side to the heel board, and on the other side to the front unit of the floor or to a side member at the front unit of the floor.

In the event of a lateral impact, the lateral reinforcement part makes it possible to transmit forces from the side member to the heel board. In the case of the front and rear units of the floor, this makes it possible to reduce the forces that are transmitted to the floor and as a result to limit the risks of the floor opening in the event of a lateral impact, for example of a pole-type impact. In addition, since the lateral reinforcement part is fixed on one side to the heel board and on the other side to the floor or to the side member, the lateral reinforcement part may be adapted for a large variety of wheelbases according to the variants of a vehicle model.

Preferably, the lateral reinforcement part comprises a rigid zone fixed to the heel board and a compressively deformable zone; the compressively deformable zone comprising means that promote its deformation. Preferably, the means that promote the compressive deformation of the deformable zone comprise at least one of the following elements: a different grade of material with respect to the rigid zone, a different sheet thickness with respect to the rigid zone, one or more notches, apertures, corrugations, ribs, or a rim, or a combination thereof.

The deformation of the compressively deformable zone makes it possible to dissipate part of the forces generated by an impact, offering protection for the passengers. The rigid zone constitutes a zone for passing force towards the heel board.

In some embodiments, the front unit comprising a rear seat crossmember with a zone that is capable of deforming compressively in the event of an impact connected to the side member and a rigid zone, the underframe structure is characterized in that the deformable zone of the lateral reinforcement part extends transversely from the side member over a length less than the length of the deformable zone of the rear seat crossmember. Since most of the forces exerted in the transverse direction of the vehicle are transmitted to the crossmember, this configuration of the deformable zone of the reinforcement part allows for good transmission of forces towards the heel board.

Preferably, the lateral reinforcement part is a part comprising a body forming an angle with the side members, extending from the heel board to the closest side member, and further comprising at least one branch extending from the body. Preferably, at least one branch extends at the rear unit of the floor. The presence of branches in the lateral reinforcement part makes it possible to better distribute the forces transmitted by the latter with respect to a part comprising a simple body.

Advantageously, the body and the branch of the lateral reinforcement part are fixed to the heel board, so as to have a more homogeneous distribution of the forces.

In some embodiments, the lateral reinforcement part being a flat sheet-metal part, the underframe structure is characterized in that the rigid zone of the lateral reinforcement part is a raised zone with respect to the deformable zone surrounded by a rigidifying rim. These embodiments make it possible to obtain a lateral reinforcement part that takes up little space, especially in the vertical direction. The lateral reinforcement part can be easily hidden under the floor covering without interfering with the visual appearance thereof.

In some embodiments, the lateral reinforcement part is a U-shaped profile member with fixing tabs. The fixing tabs can be oriented inwardly or outwardly. The profile members are simple parts that can be assembled by welding at the fitting station, without requiring an additional assembly station.

Preferably, the body of the lateral reinforcement part forms an angle of at least 30° with the side member; preferably of at least 45°. These orientations have given the best force transmission results in the context of a lateral pole-type impact.

Preferably, the lateral reinforcement part rises vertically over a distance of no more than 6 mm; preferably no more than 8 mm; preferably no more than 10 mm. The vertical limitation of the lateral reinforcement part facilitates the installation of a floor covering above the floor without modifying its visual appearance and without interfering with the placement of the feet of the user.

According to a second aspect, a motor vehicle comprising an underframe structure according to the first aspect is described. Preferably, the vehicle comprises a propulsion battery tray arranged at the front unit of the floor of the underframe structure.

BRIEF DESCRIPTION OF THE FIGURES

Other features and characteristics will become apparent from the detailed description of at least one advantageous embodiment presented below, by way of illustration, with reference to the appended figures. These show:

FIG. 1 is a bottom view of a detail of an underframe structure according to one embodiment.

FIG. 2 is a perspective top view of a detail of an underframe structure according to one embodiment.

FIG. 3 is a perspective top view of a detail of an underframe structure according to another embodiment.

DETAILED DESCRIPTION

In the remainder of the description, the term "comprise" is synonymous with "include" and is not limiting in that it allows the presence of other elements in the underframe structure, or the vehicle to which it refers. It is understood that the term "comprise" includes the term "consist of".

Likewise, the terms "lower", "upper", "top" and "bottom" will be understood according to their usual definition, in which the terms "lower" and "bottom" indicate greater proximity to the ground in the vertical direction than the terms "upper" and "top", respectively.

The terms "longitudinal", "transverse", "front" and "rear" will be understood relative to the general orientation of the vehicle as taken in its normal driving direction.

"Profile member" will be understood to mean an element of elongate shape having a particular profile in its cross-section. Profile members can be obtained by folding, stamping or profiling a sheet or several sheets previously assembled together.

As shown in FIG. 1, an underframe structure 10 of an electric or hybrid electric vehicle comprises, a floor 12, and at least two longitudinal side members 14 disposed respectively at each longitudinal edge of the floor. The underframe structure can be divided into a front unit and a rear unit which are assembled at the floor. Thus, the floor is divided into at least two units, with a front unit 16 and a rear unit 18, shown in FIGS. 2 and 3. The front and rear units of the floor can be formed by discrete pieces of sheet metal, preferably fixed together by welding. The front unit and/or the rear floor unit may have different dimensions in the longitudinal direction of the vehicle depending on the wheelbase thereof.

FIG. 1 is a bottom view of the underframe structure 10, showing the elements mounted below the floor 12.

A propulsion battery tray 20 is attached under the front unit 16 of the floor by fixing means such as, for example, screw-nut systems. The propulsion battery tray 20 can be associated with support means that can also ensure protection in the event of a lateral impact. For example, as shown in FIG. 1, the underframe structure comprises longitudinal sub-floor beams 22 which are connected to the side members by parts for protecting against lateral impacts, and the propulsion battery tray 20 is connected to the beams 22.

The rear unit is fixed to a vertical, transverse heel board 24 which separates the floor of the passenger compartment from the luggage compartment of the vehicle.

As shown, for example, in FIG. 2, the underframe structure further comprises at least one lateral reinforcement part 26 that comprises at least one elongate body extending from the heel board to the closest side member. The lateral reinforcement part 26 is fixed on one side to the heel board 24, and on the other side to the front unit 16 of the floor 12 or to a side member 14 at the front unit 16 of the floor.

The underframe structure may comprise a plurality of lateral reinforcement parts. Preferably, the underframe structure comprises at least two lateral reinforcement parts disposed symmetrically on each side of the underframe structure. To simplify, a single lateral reinforcement part will be described.

The lateral reinforcement part is a part preferably made of steel, preferably with a thickness of less than 2 mm. It may be presented in the form of a stamped plate, a profile member, or the like.

At the rear unit, the lateral reinforcement part is fixed to the vertical wall of the heel board 24. At the front unit, the lateral reinforcement part can be fixed to a vertical wall of the side member or to the floor. When the lateral reinforcement part is fixed to the floor, its fixing can be vertically aligned with the fixing of a beam 22 of the propulsion battery tray 20.

The fixing of the lateral reinforcement part at the front unit or the rear unit can be done by any means. Preferably, the lateral reinforcement part is welded in the front unit and/or in the rear unit so as not to comprise protrusions likely to interfere with the installation of a floor covering.

By performing fixing by welding, the lateral reinforcement part can be mounted with the underframe structure in an already existing fitting station of an assembly line. It is not necessary to add a station for assembling a screwed part.

The lateral reinforcement part is disposed so as to transmit the forces generated during a pole-type lateral impact, from one of the side members 14 towards the heel board 24.

At the front unit 16 of the floor, the underframe structure 10 comprises a rear seat crossmember 28, shown in FIG. 2, which can serve as a support for front seat rails not shown. In order to dampen the forces in the event of a pole impact, the rear seat crossmember may comprise a deformable zone 32 capable of deforming compressively in the event of an impact, fixed to the side member, and a rigid zone 30 which can, for example, extend transversely over at least the width of the propulsion battery tray, or to a central tunnel.

As shown, for example, in FIG. 2, the lateral reinforcement part 26 may comprise a rigid zone 34, fixed to the heel board 24 and a deformable zone 36 capable of deforming compressively in the event of an impact. The deformable zone 36 is arranged at the front unit of the floor and preferably comprises means promoting its deformation.

In order to maintain good absorption of lateral impacts, the deformable zone 36 extends transversely from the side member 14 over a length less than the length of the deformable zone 32 of the rear seat crossmember 28, i.e. the maximum length of the deformable zone 36 of the lateral reinforcement part 26 along the Y-axis of the vehicle, from the side member, does not exceed that of the deformable zone 32 of the rear crossmember along this same Y-axis.

The means that promote the compressive deformation of the deformable zone of the lateral reinforcement part comprise at least one of the following elements: a different grade of material with respect to the rigid zone, a different sheet thickness with respect to the rigid zone, one or more notches, apertures, corrugations, ribs, or a rim, or a combination thereof.

The rigid and deformable zones of the lateral reinforcement part can be formed by two discrete elements assembled by splicing or by other means.

The body of the lateral reinforcement part is disposed so as to form an angle with a side member 14. In other words, the body of the lateral reinforcement part is neither parallel nor perpendicular to the side member. To improve the transmission of forces in the event of lateral impacts, the orientation of the body of the reinforcement part corresponds to the orientation of the impact carried out during a pole impact as presented above. The body of the lateral reinforcement part preferably forms an angle of at least with the side member; preferably at least 45°.

The height of the lateral reinforcement part is determined so as not to excessively increase the height of a floor covering on which the feet of a passenger of the vehicle rest. Regardless of the configuration of the lateral reinforcement part, it will be preferred for its height, along the Z-axis of the vehicle, to be no more than 10 mm; preferably, no more than 8 mm; preferably no more than 6 mm.

In the embodiment shown in FIG. 2, the lateral reinforcement part 26 is an profile member, i.e. a U-shaped profile member with fixing tabs oriented towards the outside of the profile member. According to the variants, the lateral reinforcement part may also be a U-shaped profile member with fixing tabs oriented towards the inside of the profile member. The lateral reinforcement part herein comprises a simple body without branches. According to the variants, the lateral reinforcement part may further comprise one or several branches extending from the body. Herein, the lateral reinforcement part 26 comprises a rigid zone 34 and a compressively deformable zone 36, formed by spliced profile members having different steel grades.

In another embodiment shown in FIG. 3, the lateral reinforcement part 38 is a part comprising a body 40, and further comprising a branch 42. The body 40 extends from the heel board 24 to the front unit 16 of the floor of the underframe structure. The branch 42 splits the body at the rear unit 18 of the floor of the underframe structure. According to the variants, the lateral reinforcement part may comprise several branches that are disposed at the front unit or at the rear unit of the floor of the underframe structure.

According to the embodiments, the lateral reinforcement part can be fixed to the heel board by its body or by at least one of its branches. For example, as shown in FIG. 3, the lateral reinforcement part 38 is fixed by welding to the heel board 24 at the body 40 thereof. The body 40 of the lateral reinforcement part 38 is also fixed by welding at the front unit 16 of the floor of the underframe structure.

In this embodiment, the lateral reinforcement part 38 is a flat sheet-metal part of which the height along the Z-axis is reduced with respect to the embodiment of FIG. 2. For example, the lateral reinforcement part 38 is made of steel with a thickness of 1.5 mm or less. For example, the steel used is an E275D-type steel according to standard NF A 36-203.

The lateral reinforcement part 38 comprises a rigid zone 44, and a deformable zone 46. The rigid and deformable zones can be formed with the same grade and the same thickness of steel. The rigid zone 44 of the lateral reinforcement part 38 is a raised zone with respect to the deformable zone 46 surrounded by a rigidifying rim making it possible to rigidify the lateral reinforcement part over the entire periphery of the rigid zone 44. The rigid zone can be obtained for example by stamping.

The invention claimed is:

1. An underframe structure for a motor vehicle, the underframe structure comprising a floor and at least two side members respectively disposed at each longitudinal edge of the floor, each of the at least two side members being longitudinal; the floor being divided into at least one front unit; and one rear unit fixed to a transverse heel board; wherein the underframe structure further comprises at least one lateral reinforcement part which comprises at least one elongate body extending from the heel board towards a closest one of at least two side members, further wherein the at least one lateral reinforcement part is fixed on one side to the heel board, and on the other side to one of the at least one front units of the floor or to the closest one of at least two side members, and wherein the at least one lateral reinforcement part comprises a rigid zone fixed to the heel board and a compressively deformable zone; the compressively deformable zone comprising means that promote its deformation; the means promoting the compressive deformation of the deformable zone comprise at least one of the following elements: a different grade of material with respect to the rigid zone, a different sheet thickness with respect to the rigid zone, one or more notches, apertures, corrugations, ribs, or a rim or a combination thereof.

2. The underframe structure according to claim 1, wherein the at least one front unit comprises a rear seat crossmember with a deformable zone capable of deforming compressively in the event of an impact fixed to one of the at least two side members and a rigid zone, wherein the deformable zone of the lateral reinforcement part extends transversely from one of the at least two side members over a length less than the length of the deformable zone of the rear seat crossmember.

3. An underframe structure for a motor vehicle, the underframe structure comprising a floor and at least two side members respectively disposed at each longitudinal edge of the floor, each of the at least two side members being longitudinal; the floor being divided into at least one front unit; and one rear unit fixed to a transverse heel board; wherein the underframe structure further comprises at least one lateral reinforcement part which comprises at least one elongate body extending from the heel board towards a closest one of at least two side members, further wherein the at least one lateral reinforcement part is fixed on one side to the heel board, and on the other side to one of the at least one front units of the floor or to the closest one of at least two side members, and wherein the at least one lateral reinforcement part is a part comprising a body forming an angle with one of the at least two side members, extending from the heel board towards the closest one of the at least two side members, and further comprising at least one branch that extends at the rear unit of the floor.

4. The underframe structure according to claim 3, wherein the at least one elongate body and at least one branch of the at least one lateral reinforcement part are fixed to the heel board.

5. The underframe structure according to claim 2, wherein the at least one lateral reinforcement part is a flat sheet-metal part, further wherein the rigid zone of the at least one lateral reinforcement part is a raised zone with respect to the deformable zone surrounded by a rigidifying rim.

6. The underframe structure according to claim 1, wherein the at least one lateral reinforcement part is a U-shaped profile member with fixing tabs.

7. The underframe structure according to claim 1, wherein the at least one elongate body of the at least one lateral reinforcement part forms an angle of at least 30° with one of the at least two side members.

8. The underframe structure according to claim 1, wherein the at least one lateral reinforcement part rises vertically over a distance of no more than 6 mm.

9. A motor vehicle comprising the underframe structure according to claim 1, wherein the vehicle comprises a propulsion battery tray arranged at one of the at least one front units of the floor of the underframe structure.

10. The underframe structure according to claim 3, wherein the at least one lateral reinforcement part is a U-shaped profile member with fixing tabs.

11. The underframe structure according to claim 3, wherein the at least one elongate body of the at least one lateral reinforcement part forms an angle of at least 30° with one of the at least two side members.

12. The underframe structure according to claim 3, wherein the at least one lateral reinforcement part rises vertically over a distance of no more than 6 mm.

13. A motor vehicle comprising the underframe structure according to claim 3, wherein the vehicle comprises a propulsion battery tray arranged at one of the at least one front units of the floor of the underframe structure.

* * * * *